United States Patent
Lin

(10) Patent No.: US 12,498,761 B2
(45) Date of Patent: Dec. 16, 2025

(54) SUPPORTING STRUCTURE, FOLDABLE DISPLAY SCREEN AND TERMINAL DEVICE

(71) Applicant: Beijing Xiaomi Mobile Software Co., Ltd., Beijing (CN)

(72) Inventor: Shinbo Lin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 292 days.

(21) Appl. No.: 17/957,523

(22) Filed: Sep. 30, 2022

(65) Prior Publication Data
US 2023/0409086 A1 Dec. 21, 2023

(30) Foreign Application Priority Data
Jun. 20, 2022 (CN) .......................... 202210701669.8

(51) Int. Cl.
*G06F 1/16* (2006.01)
(52) U.S. Cl.
CPC .......... *G06F 1/1656* (2013.01); *G06F 1/1616* (2013.01); *G06F 1/1652* (2013.01)
(58) Field of Classification Search
CPC .... G06F 1/1656; G06F 1/1616; G06F 1/1652; H04M 1/0216; H04M 1/0268; G09F 9/301; G09F 9/335
See application file for complete search history.

(56) References Cited

U.S. PATENT DOCUMENTS

| | | | | |
|---|---|---|---|---|
| 11,425,833 B2 * | 8/2022 | Kim | ...................... | H05K 5/0017 |
| 2017/0294495 A1 * | 10/2017 | Shyu | ................... | H10K 50/8423 |
| 2020/0168824 A1 * | 5/2020 | Park | ...................... | H05K 1/0283 |
| 2021/0165454 A1 * | 6/2021 | Dong | .................... | G06F 1/1652 |
| 2021/0233447 A1 * | 7/2021 | Park | ........................ | G06F 1/1616 |
| 2021/0352814 A1 * | 11/2021 | Park | ......................... | B32B 3/266 |
| 2022/0147107 A1 * | 5/2022 | Wang | .................... | G06F 1/1637 |
| 2023/0085742 A1 * | 3/2023 | Yang | ..................... | G06F 1/1656 |
| | | | | 361/679.01 |

FOREIGN PATENT DOCUMENTS

CN 113257123 A * 8/2021 ............. G09F 9/301

OTHER PUBLICATIONS

Extended European Search Report issued on Jun. 2, 2023 for European Patent Application No. 22198574.0.

* cited by examiner

*Primary Examiner* — Allen L Parker
*Assistant Examiner* — Keon Kim
(74) *Attorney, Agent, or Firm* — Volpe Koenig

(57) ABSTRACT

Provided is a supporting structure for supporting a flexible display panel. The supporting structure includes a first bent region. The supporting structure is provided with a plurality of hollow structures distributed in an array in the first bent region, in which each of the plurality of hollow structure includes an elongated hole and at least one through hole, in which the at least one through hole is in communication with one end of the elongated hole, and a width of the elongated hole is less than that of the at least one through hole in a target direction perpendicular to an extension direction of a length of the elongated hole.

20 Claims, 12 Drawing Sheets

SUPPORTING STRUCTURE, FOLDABLE DISPLAY SCREEN AND TERMINAL DEVICE

CROSS REFERENCE TO RELATED APPLICATIONS

The application is provided on the basis of the Chinese Patent Application No. 202210701669.8, filed on Jun. 20, 2022, and claims the benefit of priority to the Chinese Patent Application, the entire contents of which are incorporated herein by reference.

BACKGROUND

Terminal devices have become indispensable electronic products in life. A variety of terminal devices, such as mobile phones, tablet computers, and notebook computers, add convenience to life in an overwhelming way. Nowadays, foldable terminal devices have gained popularity among an increasing number of people.

Foldable display screens of foldable terminal devices generally include flexible display panels and supporting plates. The supporting plates can be connected to back surfaces (that is, surfaces opposite display surfaces of the flexible display panels) of the flexible display panels so as to support the flexible display panels.

SUMMARY

The disclosure relates to the technical field of display, and relates to a supporting structure, a foldable display screen, and a terminal device.

One aspect of an example of the disclosure provides a supporting structure. The supporting structure is used for supporting a flexible display panel of a foldable display screen, and the supporting structure includes a first bent region.

The supporting structure is provided with a plurality of hollow structures distributed in an array in the first bent region, in which each of the plurality of hollow structures comprises an elongated hole and at least one through hole in which the at least one through hole is in communication with an end of the elongated hole. A width of the elongated hole is less than a width of the at least one through hole in a target direction perpendicular to an extension direction of a length of the elongated hole.

Another aspect of an example of the disclosure provides a foldable display screen including a flexible display panel and a supporting structure for supporting the flexible display panel.

The supporting structure is connected to a back surface of the flexible display panel, and the supporting structure comprises a first bent region.

The supporting structure is provided with a plurality of hollow structures distributed in an array in the first bent region, in which each of the plurality of hollow structures includes an elongated hole and at least one through hole, in which the at least one through hole is in communication with one end of the elongated hole. A width of the elongated hole is less than a width of the at least one through hole in a target direction perpendicular to an extension direction of a length of the elongated hole.

Yet another aspect of an example of the disclosure provides a terminal device including a foldable display screen, including a flexible display panel and a supporting structure for supporting a flexible display panel.

The supporting structure is connected to a back surface of the flexible display panel, and the supporting structure comprises a first bent region.

The supporting structure is provided with a plurality of hollow structures distributed in an array in the first bent region, in which each of the plurality of hollow structures includes an elongated hole and at least one through hole, in which the at least one through hole is in communication with an end of the elongated hole. A width of the elongated hole is less than a width of the at least one through hole in a target direction perpendicular to an extension direction of a length of the elongated hole.

BRIEF DESCRIPTION OF THE DRAWINGS

The accompanying drawings here, which are incorporated in the description as a constituent part of the present description, illustrate examples consistent with the disclosure, and are used to explain the principles of the disclosure together with the description.

DETAILED DESCRIPTION

In order to make the objectives, technical solutions, and advantages of the disclosure clearer, examples of the disclosure will be further described in detail below with reference to the accompanying drawings.

The examples will be described in detail here and shown in the accompanying drawings illustratively. When the following descriptions relate to the accompanying drawings, unless otherwise specified, the same reference sign in different accompanying drawings denotes the same or similar element. The implementations described in the following examples do not denote all implementations consistent with the disclosure. On the contrary, they are merely examples of an apparatus and a method consistent with some aspects of the disclosure as detailed in the appended claims.

Figure 1:
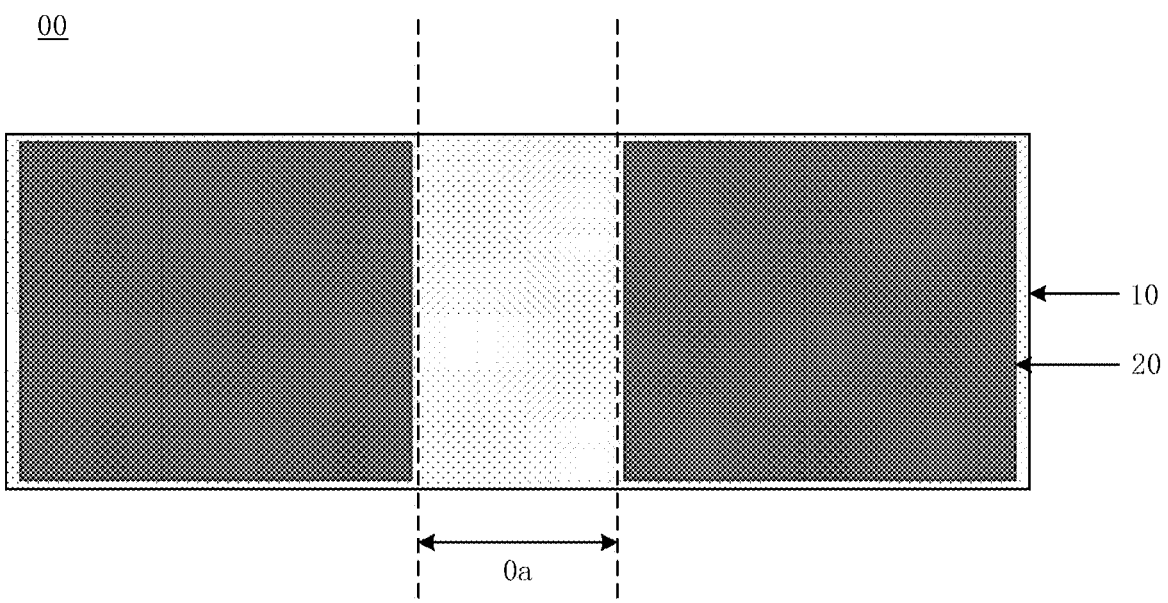
FIG. 1 is a top view of a common foldable display screen at present.

With reference to FIG. 1, a top view of a common foldable display screen at present is shown in FIG. 1. The foldable display screen 00 may be provided with a bent region 0a, and the foldable display screen 00 includes a flexible display panel 10 and a supporting plate 20.

Figure 2:
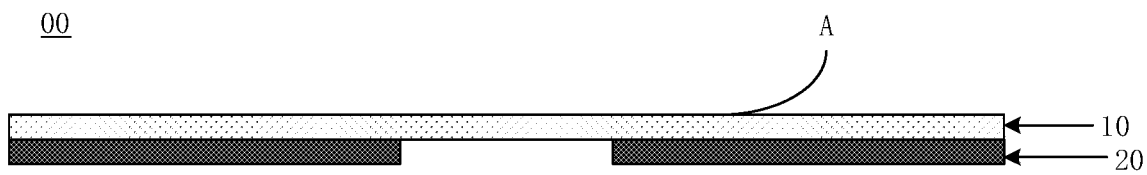
FIG. 2 is a schematic structural diagram of a side surface of the foldable display screen shown in FIG. 1.

In order to more clearly observe the structure of the foldable display screen, with reference FIG. 2, a schematic structural diagram of a side surface of the foldable display screen shown in FIG. 1 is shown in FIG. 2. The supporting plate 20 may be connected to a back surface (that is, a surface opposite a display surface A of the flexible display panel) of the flexible display panel 10. In order to conveniently fold the foldable display screen 00, a portion of the supporting plate 20 positioned at the bent region 0a may be removed.

In this case, since the portion of the supporting plate 20 positioned in the bent region 0a is removed, the supporting plate 20 may not provide a supporting force for the portion of the flexible display panel 10 positioned in the bent region 0a, resulting in a low press-resistant capability of the portion of the flexible display panel 10 positioned in the bent region 0a. Thus, the portion of the flexible display panel 10 positioned in the bent region 0a is extremely likely to be damaged, resulting in a short service life of the foldable display screen 00.

Figure 3:
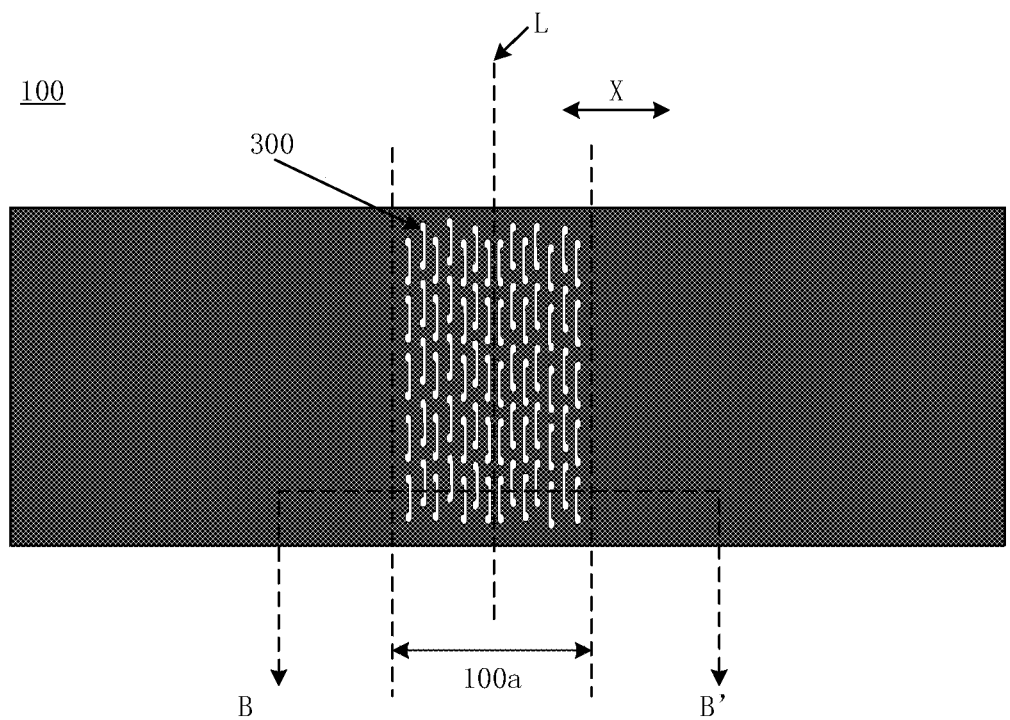
FIG. 3 is a top view of a supporting structure provided in an example of the disclosure.
Figure 4:
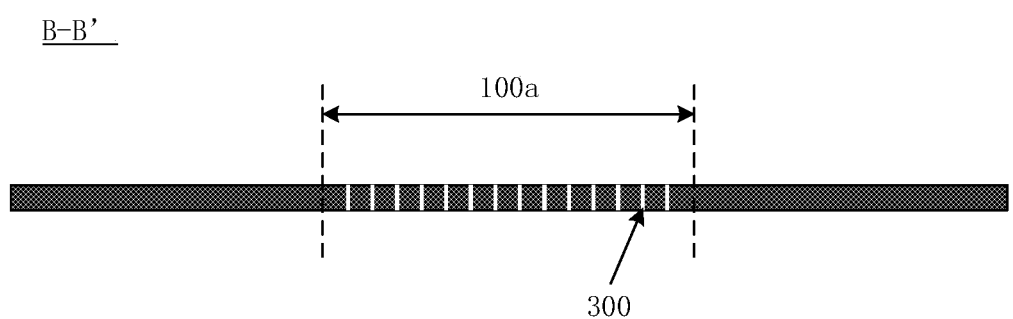
FIG. 4 is a sectional view along B-B' of the supporting structure shown in FIG. 3.

With references to FIGS. 3 and 4, a top view of a supporting structure provided in an example of the disclosure is shown in FIG. 3, and a sectional view along B-B' of the supporting structure shown in FIG. 3 is shown in FIG. 4. The foldable display screen may include a supporting structure 100 and a flexible display panel (not shown in the figures). The supporting structure 100 is used for supporting the flexible display panel. The supporting structure 100 includes a first bent region 100a. In the disclosure, a width of the first bent region 100a is not specifically limited, and may be set and modified as required. For example, the width of the first bent region 100a is positively correlated with a bending radius of the foldable display screen.

Figure 5:
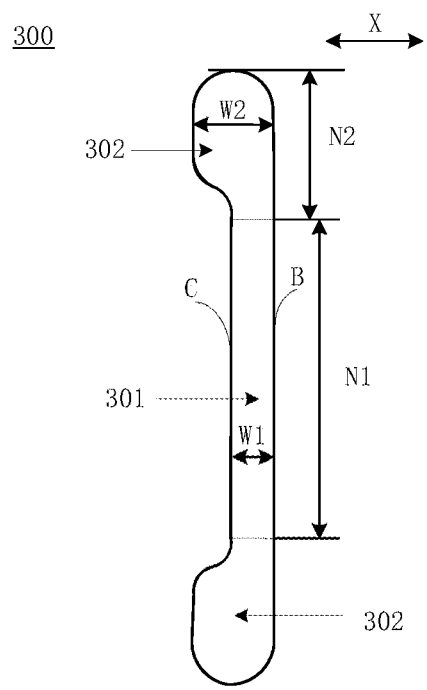
FIG. 5 is a schematic diagram of a hollow structure in the supporting structure shown in FIG. 3.

The supporting structure 100 is provided with a plurality of hollow structures 300 distributed in an array in the first bent region 100a. In order to more clearly show the structure of the hollow structure 300, with references to FIG. 5, a schematic diagram of a hollow structure in the supporting structure shown in FIG. 3 is shown in FIG. 5. Each hollow structure 300 may include an elongated hole 301 and at least one through hole 302, and the at least one through hole 302 is in communication with an end of the elongated hole 301. That is, there may be one or two through holes 302 in each hollow structure 300. Under the situation that there is one through hole 302 in each hollow structure 300, the through hole 302 may be in communication with any one end of the elongated hole 301. Under the situation that there are two through holes 302 in each hollow structure 300, the two through holes 302 may be respectively in communication with two ends of the elongated hole 301. It should be noted that an example in which each hollow structure 300 includes two through holes 302 is taken in FIG. 5 for a schematic description.

That the plurality of hollow structures 300 are distributed in an array means that the plurality of hollow structures 300 are arranged in an array including a plurality of rows and a plurality of columns. For example, the plurality of hollow structures 300 are arranged in a plurality of rows in an extension direction of a length of the elongated hole 301, and in a plurality of columns in a direction perpendicular to the extension direction of the length of the elongated hole 301. The length of the elongated hole 301 is equal to a distance between two ends in the extension direction of the length of the elongated hole 300.

A width W1 of the elongated hole 301 is less than a width W2 of the through hole 302 in a target direction X perpendicular to the extension direction of the length of the elongated hole 301. It should be noted that the supporting structure may be bent around a bending axis L, and the extension direction of the length of the elongated hole 301 is parallel to a direction of the bending axis L. For example, the bending axis L may be an axis of a bent structure formed by the first bent region 100a when the supporting plate 100 is bent. A width of the elongated hole 301 at all positions of the elongated hole 301 is constant in the target direction X.

In an example of the disclosure, the foldable display screen may be obtained by connecting the supporting structure 100 to the flexible display panel. The plurality of hollow structures 300 arranged in an array are distributed in the first bent region 100a of the supporting structure 100, and a width of the elongated hole 301 is less than a width of the through hole 302 in the hollow structure 300 in the target direction X perpendicular to the extension direction of the length of the elongated hole. Thus, by means of the through hole 302 having a greater width in the hollow structure 300, the bending property of a portion of the first bent region 100a in the supporting structure 100 may be improved such that the flexible display panel connected to the supporting structure 100 may be repeatedly folded and unfolded. By means of the elongated hole 301 having a smaller width in the hollow structure 300, a contact area between the first bent region 100a and the flexible display panel may be increased, so as to improve the capability of resisting pressing of a portion of the flexible display panel positioned in the first bent region 100a. It can be seen that by arranging the plurality of hollow structures 300 on the supporting structure 100, the bending property of the flexible display panel may be satisfied, and the capability of resisting pressing of the flexible display panel may be improved. Thus, damage from pressing the flexible display panel is avoided, and the service life of the foldable display screen is prolonged.

In summary, an example of the disclosure provides the supporting structure. The plurality of hollow structures arranged in an array are distributed in the first bent region of the supporting structure, and a width of the elongated hole is less than a width of the through hole in the hollow structure in the target direction perpendicular to the extension direction of the length of the elongated hole. Thus, by means of the through hole having a greater width in the hollow structure, the bending property of the first bent region of the supporting structure may be improved such that the flexible display panel connected to the supporting structure may be repeatedly folded and unfolded. By means of the elongated hole having a smaller width in the hollow structure, a contact area between the first bent region and the flexible display panel may be increased, so as to improve the capability of resisting pressing of the portion of the flexible display panel positioned in the first bent region. It can be seen that by arranging the plurality of hollow structures on the supporting structure, the bending property of the supporting structure may be satisfied, and the capability of resisting pressing of the flexible display panel may be improved. Thus, damage from pressing the flexible display panel is avoided, and the service life of the foldable display screen is prolonged.

Figure 6:
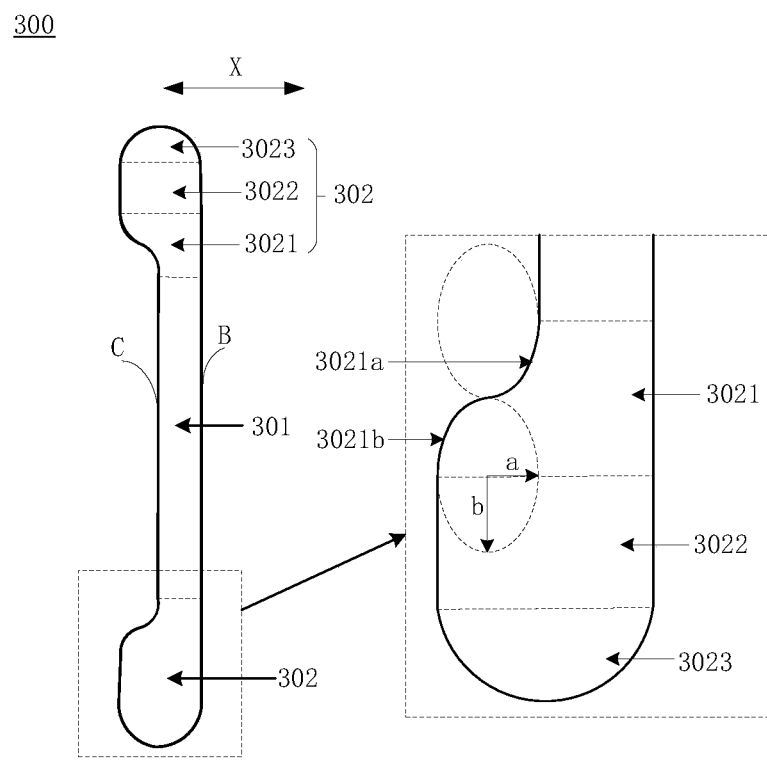
FIG. 6 is a schematic structural diagram of a through hole in the hollow structure shown in FIG. 5.

In an example of the disclosure, as shown in FIG. 6, a schematic structural diagram of a through hole in the hollow structure shown in FIG. 5 is shown in FIG. 6. A width of the through hole 302 in the hollow structure 300 in the target direction X is not constant at all positions. For example, in the hollow structure 300, widths of at least parts of the through hole 302 in the target direction X is gradually increased in a direction from the elongated hole 301 to the through hole 302.

In this case, a width of at least parts of the through hole 302 of the hollow structure 300 in the target direction X is gradually increased in a direction from the elongated hole 301 to the through hole 302. Thus, in the target direction X, the width of the hollow structure 300 at all positions does not abruptly change, but instead gradually changes. In this way, during a folding of the supporting structure 100, it is guaranteed that the internal stress of the first bent region 100a of the supporting structure 100 at all positions does not abruptly change, so as to guarantee that the flexible display panel may be normally folded or unfolded. Moreover, under the situation that the width of at least parts of the through hole 302 in the target direction X is gradually increased in the direction from the elongated hole 301 to the through hole 302, the contact area between the first bent region 100a and the flexible display panel may be further increased, so as to further improve capability of resisting pressing of the portion of the flexible display panel positioned in the first bent region 100a.

For example, as shown in FIG. 6, the through hole 302 in the hollow structure 300 may include a first through sub-hole 3021 and a second through sub-hole 3022 in communication with the first through sub-hole 3021. The first through sub-hole 3021 is closer to the elongated hole 301 than the second through sub-hole 3022. In the target direction X, a width of the first through sub-hole 3021 at all positions is gradually increased in a direction from the elongated hole 301 to the second through sub-hole 3022, and a width of the second through sub-hole 3022 at all positions is constant. Here, in the hollow structure 300, the width of the second through sub-hole 3022 in the target direction X is greater than the width of the elongated hole 301 in the target direction X.

In this case, by providing the first through sub-hole 3021 in the hollow structure 300, the situation that the width of the hollow structure 300 at all positions in the target direction X abruptly changes may be avoided. By providing the second through sub-hole 3022 having a greater width in the hollow structure 300, it is guaranteed that the bending property of a portion of the supporting structure 100 connected to the first bent region 100a is desirable.

In some examples, as shown in FIG. 6, an inner wall of the first through sub-hole 3021 includes a first arc inner wall 3021a and a second arc inner wall 3021b that are arranged in the extension direction of the length of the elongated hole 301. The first arc inner wall 3021a is closer to the elongated hole 301 than the second arc inner wall 3021b. That is, in the first through sub-hole 3021, an inner wall connected to an inner wall of the elongated hole 301 is the first arc inner wall 3021a, and an inner wall connected to an inner wall of the second through sub-hole 3022 is the second arc inner wall 3021b. Here, the first arc inner wall 3021a may be an arc convex surface, and the arc convex surface is convex towards a direction close to the second through sub-hole 3022. The second arc inner wall 3021b may be an arc concave surface, and the arc concave surface is concave towards a direction away from the second through sub-hole 3022.

In an example of the disclosure, the first arc inner wall 3021a connected to the inner wall of the elongated hole 301 is an arc convex surface, and the second arc inner wall 3021b connected to the inner wall of the second through sub-hole 3022 is an arc concave surface. Thus, a smooth transition may be achieved between the elongated hole 301 and the first through sub-hole 3021, and a smooth transition may be achieved between the second through sub-hole 3022 and the first through sub-hole 3021. In this way, the problem that the width of the hollow structure 300 at all positions in the target direction X abruptly changing may be avoided as much as possible.

For example, a shape of the first arc inner wall 3021a is the same as a shape of the second arc inner wall 3021b. In this way, during the folding of the portion of the supporting structure 100 connected to the first bent region 100a, the first arc inner wall 3021a of the supporting structure 100 and the second arc inner wall 3021b have the substantially same internal stress, so as to guarantee that the supporting structure 100 may be better folded or unfolded.

It should be noted that the shape of the first arc inner wall 3021a and the shape of the second arc inner wall 3021b may each be a circular arc or an elliptical arc.

In some examples, under the situation that the shape of the first arc inner wall 3021a and the shape of the second arc inner wall 3021b are each an elliptical arc, a direction of a major axis of the elliptical arc is parallel to the extension direction of the length of the elongated hole 301, and a direction of a minor axis of the elliptical arc is parallel to the target direction X.

A ratio of a width of the major axis of the elliptical arc to a width of the supporting structure 100 in the target direction X is 1/100 to 1/200, and a ratio of a width of the minor axis of the elliptical arc to the width of the supporting structure 100 in the target direction X is 1/100 to 1/400. For example, the width of the major axis b of the elliptical arc may range from 0.1 mm to 1 mm, and the width of the minor axis a of the elliptical arc may range from 0.1 mm to 0.5 mm.

In an example of the disclosure, the shape of the first arc inner wall 3021a and the shape of the second arc inner wall 3021b are each an elliptical arc, such that a gradient of a width change between the elongated hole 301 and the first through sub-hole 3021 may be decreased, and a gradient of a width change between the second through sub-hole 3022 and the first through sub-hole 3021 may be decreased. Thus, a smooth transition of a width may be further guaranteed, and thus the problem that the width of the hollow structure 300 at all positions in the target direction X abruptly changes may be further avoided.

In an example of the disclosure, as shown in FIG. 6, the through hole 302 of the hollow structure 300 may further include a third through sub-hole 3023 in communication with the second through sub-hole 3022, and the second through sub-hole 3022 is closer to the elongated hole 301 than the third through sub-hole 302. In the target direction X, a width of the third through sub-hole 3023 at all positions is less than or equal to the width of the second through sub-hole 3022, and the width of the third through sub-hole 3023 at all positions is gradually decreased in a direction from the elongated hole 301 to the third through sub-hole 3023. In this way, during the folding of the first bent region 100a of the supporting structure 100, the problem of stress concentration at two ends of the hollow structure 300 of the supporting structure 100 may be avoided, so as to further improve the bending property of the first bent region 100a.

It should be noted that the inner wall of the third through sub-hole 3023 may be in a shape of a circular arc or elliptical arc. For example, the inner wall of the third through sub-hole 3023 is in a shape of a circular arc, and a ratio of a radius of the circular arc to the width of the supporting structure 100 in the target direction X is 1/100 to 1/400. In some possible examples, a width of a radius of the circular arc may range from 0.1 mm to 0.5 mm. In this way, it is guaranteed that the two ends of the hollow structure 300 are relatively rounded, so as to reduce the probability of stress concentration at the two ends of the hollow structure 300 in the supporting structure 100 as much as possible.

In some examples, the ratio of the width of the elongated hole 301 in the target direction X to the width of the supporting structure 100 in the target direction X is 1/100 to 1/200, and the ratio of the length of the elongated hole 301 to the length of the supporting structure 100 in the direction perpendicular to the target direction X is 1/5 to 1/2. For example, in some possible examples, a width W1 of the elongated hole 301 in the hollow structure 300 in the target direction X may range from 0.1 mm to 1 mm, and a width W2 of the second through sub-hole 3022 of the through hole 302 in the target direction X may range from 0.2 mm to 2 mm. In some possible examples of the disclosure, a length N1 of the elongated hole 301 in the hollow structure 300 may range from 1 mm to 12 mm, and a length N2 of the through hole 302 may range from 1 mm to 4 mm.

In the disclosure, by designing a size of each hollow structure 300 of the supporting structure 100, it is guaranteed that the bending property of the first bent region is desirable. Further, it is guaranteed that the contact area between the first bent region 100a and the flexible display panel is large, so as to guarantee that the capability of resisting pressing of the portion of the flexible display panel positioned in the first bent region 100a is desirable.

In the disclosure, as shown in FIG. 5, the hollow structure 300 is provided with a first inner wall B and a second inner wall C opposite the first inner wall B. A portion of the first inner wall B positioned in the elongated hole 301 and a portion of the first inner wall B positioned in the through hole 302 are coplanar, and a portion of the second inner wall C positioned in the elongated hole 301 and a portion of the second inner wall C positioned in the through hole 302 are non-coplanar. The plurality of hollow structures 300 are divided into two groups, in which one group of hollow structures 300 are all positioned on one side of a bending axis L, and another group of hollow structures 300 are all positioned on another side of the bending axis L.

In this case, under the situation that one group of the hollow structures 300 are all positioned on one side of the bending axis L and another group of the hollow structures 300 are all positioned on another side of the bending axis L, one group of the hollow structures 300 and another group of the hollow structures 300 may be symmetrically distributed on the two sides of the bending axis L. Thus, internal stress on a portion of the supporting structure 100 positioned on one side of the bending axis L is similar to internal stress on a portion of the supporting structure 100 positioned on another side of the bending axis L. In this way, it is guaranteed that internal stress on the entire supporting structure 100 is uniform during the folding or unfolding of the supporting structure 100.

In the disclosure, an arrangement mode of the plurality of hollow structures 300 is not specifically limited. The plurality of hollow structures 300 are divided into two groups. The first inner wall B of each hollow structure 300 in one group of the hollow structures 300 and the first inner wall B of each hollow structure 300 in another group of the hollow structures 300 are arranged back to back. Or, the first inner wall B of a first hollow structure is adjacent to the first inner wall B of a second hollow structure, and the second inner wall C of the first hollow structure is adjacent to the second inner wall C of a third hollow structure, in which the first hollow structure, the second hollow structure and the third hollow structure are any three adjacent hollow structures in a row of hollow structures 300, and the first hollow structure is positioned between the second hollow structure and the third hollow structure. It should be noted that in other possible implementations, the first inner wall B of each hollow structure 300 in one group of hollow structures 300 and the first inner wall B of each hollow structure 300 in another group of hollow structures 300 may be arranged face to face.

Figure 7:
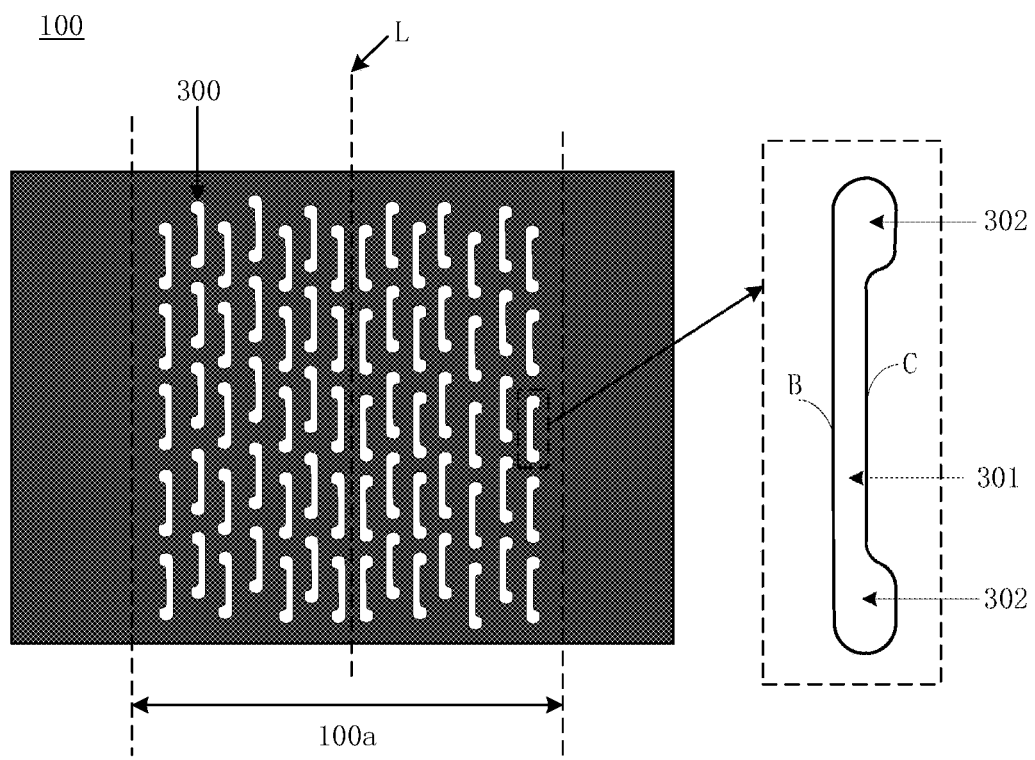
FIG. 7 is a schematic diagram of an arrangement mode of a plurality of hollow structures provided in an example of the disclosure.
Figure 8:
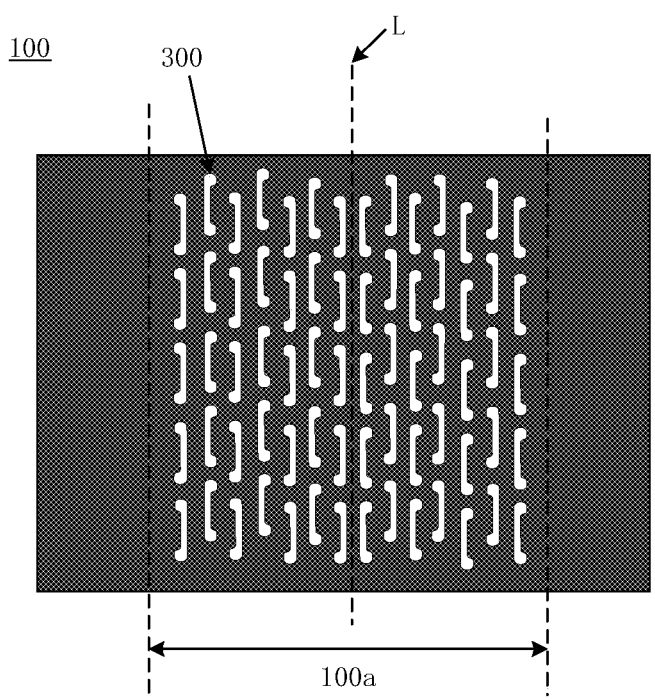
FIG. 8 is a schematic diagram of another arrangement mode of a plurality of hollow structures provided in an example of the disclosure.

For example, in a possible implementation, as shown in FIG. 7 which shows a schematic diagram of an arrangement mode of a plurality of hollow structures provided in an example of the disclosure, in any one group of hollow structures 300, the first inner wall B of each hollow structure 300 is closer to the bending line L than the second inner wall C. In another possible implementation, as shown in FIG. 8 which shows a schematic diagram of another arrangement mode of a plurality of hollow structures provided in an example of the disclosure, for any two adjacent hollow structures 300 in a row of hollow structures 300, the first inner wall B is closer to the bending line L than the second inner wall C in one hollow structure 300, and the second inner wall C is closer to the bending line L than the first inner wall B in another hollow structure 300. It should be noted that in other possible implementations, in any group of the hollow structures 300, the second inner wall C of each hollow structure 300 may be closer to the bending line L than the first inner walls B.

Figure 9:
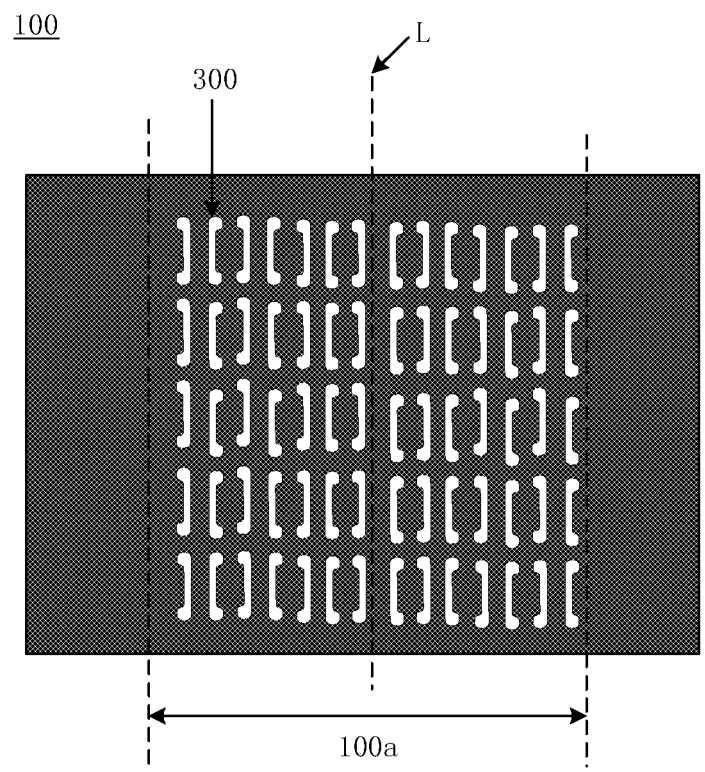
FIG. 9 is a schematic diagram of another arrangement mode of a plurality of hollow structures provided in an example of the disclosure.

In an example of the disclosure, the hollow structures 300 in a row of hollow structures 300 may be aligned or not aligned with each other in the target direction X. For example, under the situation that all the hollow structures 300 in a row of hollow structures 300 are not aligned with each other in the target direction X, as shown in FIG. 8, for any two adjacent hollow structures 300 in a row of hollow structures 300, the through hole 302 of one hollow structure 300 is adjacent to the elongated hole 301 of another hollow structure 300. Under the situation that all the hollow structures 300 in a row of hollow structures 300 are aligned with each other in the target direction X, as shown in FIG. 9 which shows a schematic diagram of another arrangement mode of a plurality of hollow structures provided in an example of the disclosure, for any two adjacent hollow structures 300 in a row of hollow structures 300, the through hole 302 of one hollow structure 300 is adjacent to the through hole 302 of another hollow structure 300.

Figure 10:
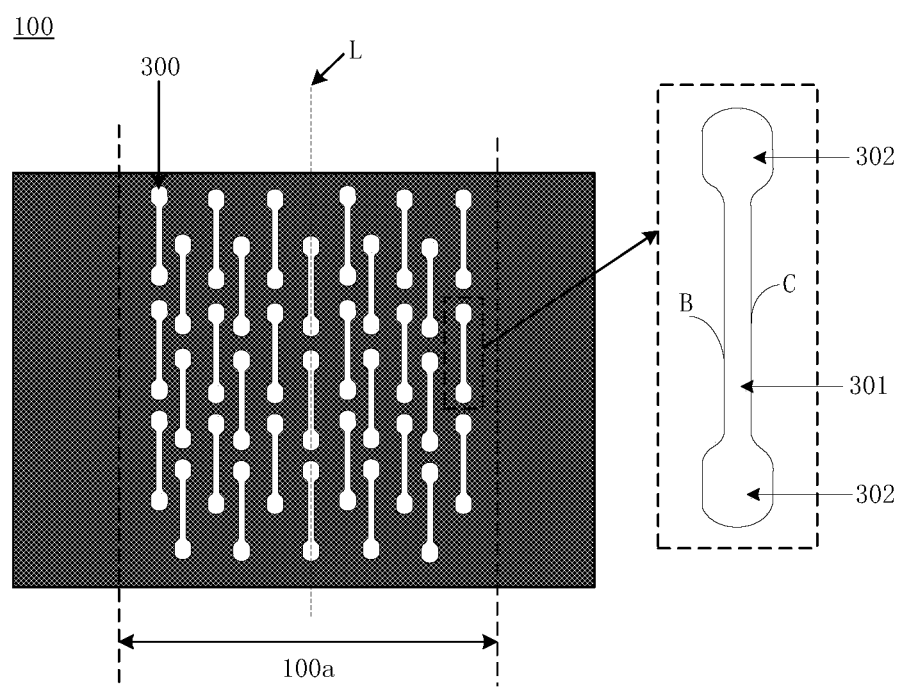
FIG. 10 is a schematic diagram of another hollow structure provided in an example of the disclosure.

It should be noted that a situation that the portion of the first inner wall B of the hollow structure 300 positioned in the elongated hole 301 and the portion of the first inner wall B positioned in the through hole 302 are coplanar, and the portion of the second inner wall C of the hollow structure 300 positioned in the elongated hole 301 and the portion of the second inner wall C positioned in the through hole 302 are non-coplanar is taken in an example of the disclosure for schematic description. In other possible implementations, as shown in FIG. 10 which a schematic diagram of another hollow structure provided in an example of the disclosure, the portion of the first inner wall B of the hollow structure 300 positioned in the elongated hole 301 and the portion of the first inner wall B positioned in the through hole 302 are non-coplanar, and the portion of the second inner wall C of the hollow structure 300 positioned in the elongated hole 301 and the portion of the second inner wall C positioned in the through hole 302 are both non-coplanar. In this case, each of the plurality of hollow structures 300 may be a symmetrical structure, and the hollow structures 300 may have a symmetrical plane parallel to the bending axis L. In addition, some hollow structures 300 of the plurality of hollow structures 300 may be distributed on the bending axis L, and the bending axis L may be positioned in the symmetrical plane of this part of the hollow structures 300. It should be noted that, for other structural features and related sizes of the hollow structures 300, reference may be made to the corresponding contents in the above examples, which will not be repeated here.

Figure 11:
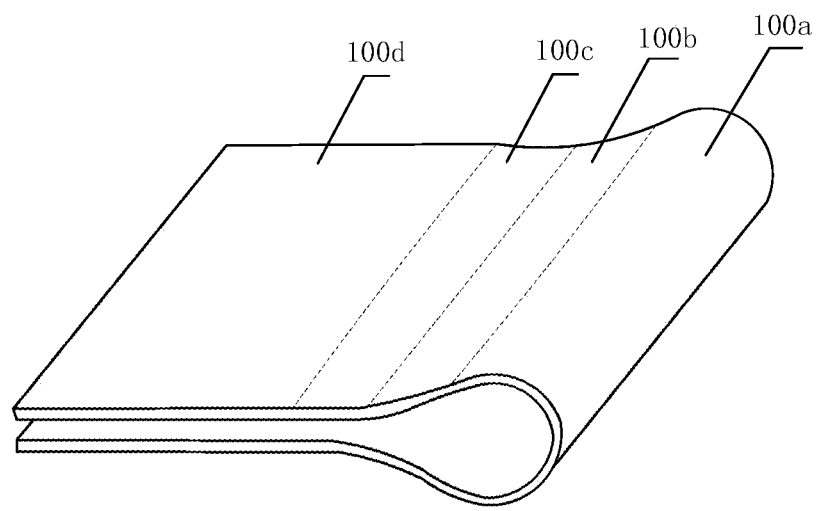
FIG. 11 is a schematic diagram of a folded supporting structure provided in an example of the disclosure.
Figure 12:
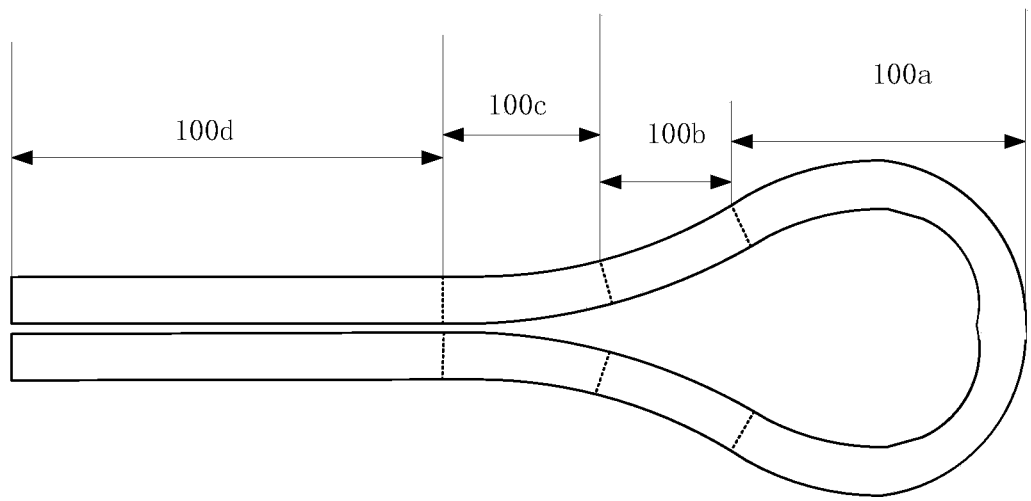
FIG. 12 is a schematic sectional view of the folded supporting structure shown in FIG. 11.

In an example of the disclosure, the foldable display screen may be a "waterdrop-shaped" foldable display screen. Under the situation that the supporting structure 100 is folded to a final state, a bent portion of the supporting structure 100 is "waterdrop-shaped". For example, with reference to FIGS. 11 and 12, a schematic view of a folded supporting structure provided in an example of the disclosure is shown in FIG. 11, and a schematic sectional view of the folded supporting structure shown in FIG. 11 is shown in FIG. 12. The supporting structure 100 is further provided with a second bent region 100b and a third bent region 100c that are each positioned on two sides of the first bent region 100a. The second bent region 100b is positioned between the third bent region 100c and the first bent region 100a. After the supporting structure 100 is folded, a bending curvature of the first bent region 100a is the greatest, while a bending curvature of the second bent region 100b is the smallest, and the bending curvature of the third bent region 100c is between the bending curvature of the first bent region 100a and the bending curvature of the second bent region 100b. In this way, after the supporting structure 100 is folded, the first bent region 100a, the second bent region 100b, and the third bent region 100c may be "waterdrop-shaped".

It should be noted that the first bent region 100a, the second bent region 100b, and the third bent region 100c may mutually define a bent region of the supporting structure 100. This supporting structure 100 is generally provided with a flat region 100d positioned on two sides of the bent region. After the supporting structure 100 is folded, the two flat regions 100d of the supporting structure 100 are oppositely arranged and may be attached together.

In an example of the disclosure, there are various possible implementations for the structure of the second bent region 100b of the supporting structure 100. The following two optional implementations are taken as examples of the disclosure for schematic description.

Figure 13:
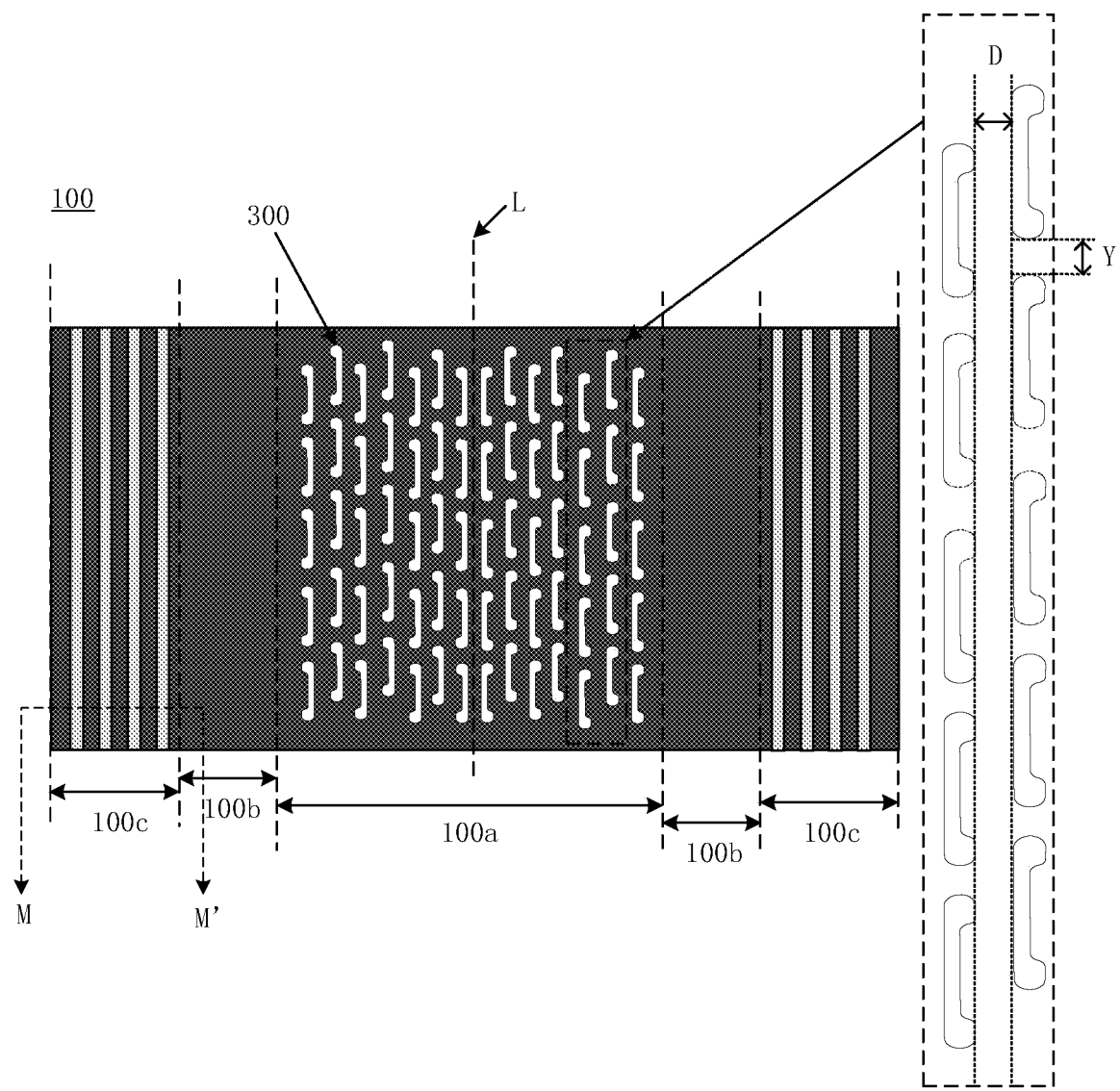
FIG. 13 is a top view of another supporting structure provided in an example of the disclosure.

A first optional implementation is as shown in FIG. 13, in which a top view of another supporting structure provided in an example of the disclosure is shown. The second bent region 100b is not provided with hollow structures 300. That is, the second bent region 100b is of a planar structure set as an entire surface. In this case, since the second bent region 100b is of a planar structure, in the second bent regions 100b, a contact area between the supporting structure 100 and the flexible display panel is large, such that capability of resisting pressing of a portion of the flexible display panel positioned in the second bent region 100b is large. Since the bending curvature of the second bent region 100b is the smallest, even if the second bent region 100b is not provided with hollow structures, it is guaranteed that the second bent region 100b may be normally slightly bent.

In some examples, under the situation that the second bent region 100b is of a planar structure, the plurality of hollow structures 300 in the first bent region 100a are divided into a first hollow structure group 300a, and second hollow structure groups 300b positioned on two sides of the first hollow structure group 300a. In the first hollow structure group 300a, an area of an opening of each hollow structure 300 on the supporting structure 100 is equal to each other. In the second hollow structure groups 300b, a length of the elongated hole of each hollow structure 300 in the same row of hollow structures 300 is gradually decreased in a direction close to the second bent region 100b; or, a distance between any two adjacent hollow structures 300 in each row of hollow structures 300 is gradually increased in the direction close to the second bent region 100b; or, a length of the elongated hole of each hollow structure 300 in the same row of hollow structures 300 is gradually decreased in a direction close to the second bent region 100b, and at the same time, a distance between any two adjacent hollow structures 300 in each row of hollow structures 300 is gradually increased in the direction close to the second bent region 100b.

It should be noted that a situation where a distance D between any two adjacent hollow structures 300 in a row of hollow structures 300 is the same, and a distance Y between any two adjacent hollow structures 300 in a column of hollow structures 300 is also the same, is taken as an example of the disclosure for schematic description. A ratio of a distance D between any two adjacent hollow structures in a row of hollow structures to the width of the supporting structure 100 in the target direction X is 1/100 to 1/200, and a ratio of a distance Y between any two adjacent hollow structures in a column of hollow structures to the width of the supporting structure 100 in the target direction X is 1/100 to 1/40. For example, in some possible examples, as shown in FIG. 13, a distance X between any two adjacent hollow structures in a row of hollow structures may range from 0.1 mm to 1 mm, and a distance Y between any two adjacent hollow structures in a column of hollow structures may range from 0.1 mm to 5 mm.

For an arrangement mode of the hollow structures 300 in the second hollow structure group 300b, the following three situations are taken as examples in an example of the disclosure for description.

Figure 14:
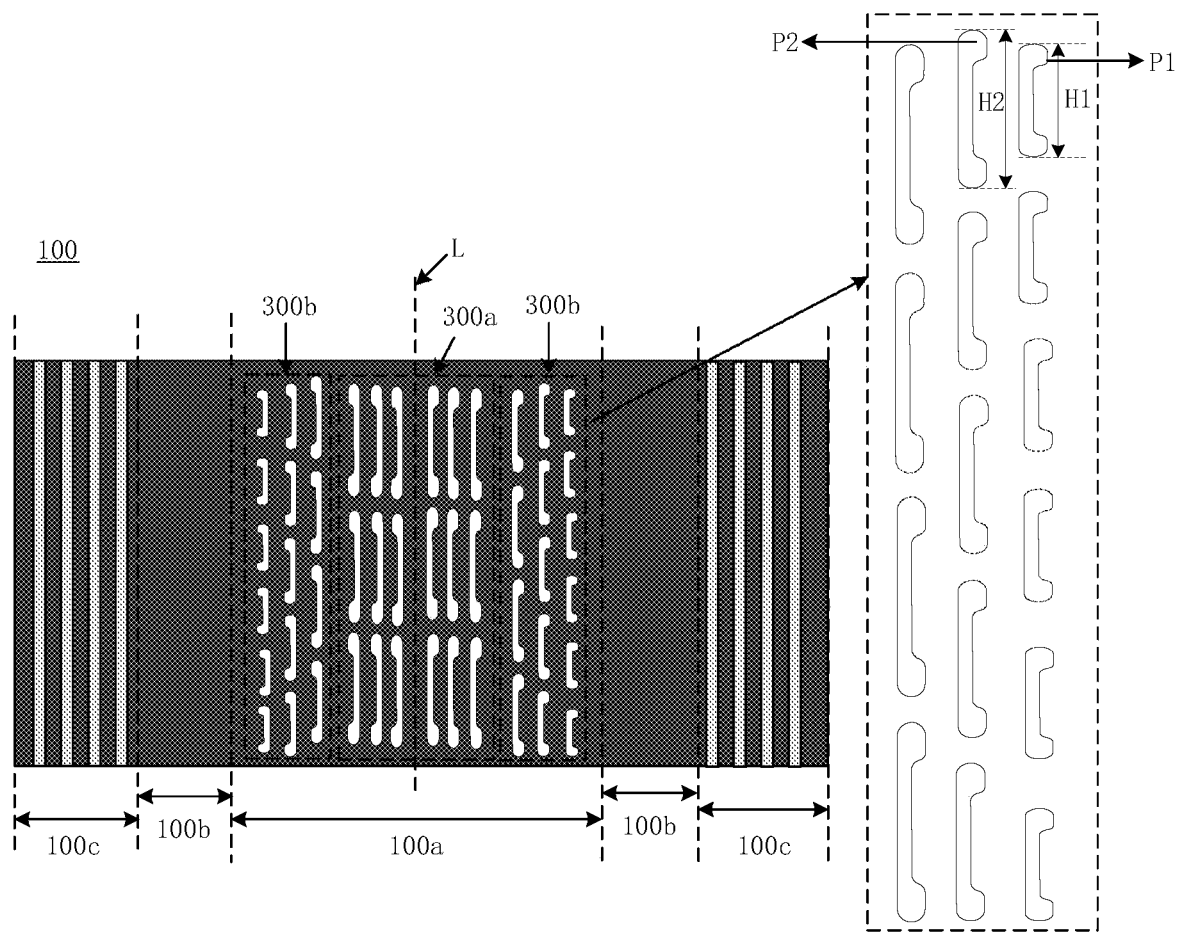
FIG. 14 is a top view of yet another supporting structure provided in an example of the disclosure.

A first case is shown in FIG. 14, which shows a top view of another supporting structure provided in an example of the disclosure. In the second hollow structure group 300b, under the situation that the length of the elongated hole of each hollow structure 300 in the same row of hollow structures 300 is gradually decreased in the direction close to the second bent region 100b, the contact area between a portion of the supporting structure 100 for the second hollow structure group 300b to be arranged and the flexible display panel is gradually increased in the direction close to the second bent region 100b. The contact area between the supporting structure 100 and the flexible display panel is positively correlated with a modulus of the supporting structure 100. Thus, the modulus of the portion of the supporting structure 100 for the second hollow structure group 300b to be arranged gradually changes in a direction from the second bent region 100a to the second bent region 100b. A modulus of a portion of the supporting structure 100 for the first hollow group 300a to be arranged is the smallest, and a modulus of a portion of the supporting structure 100 for a planar structure (that is, a portion positioned in the second bent region 100b) to be arranged is the greatest. Thus, by providing a portion (that is, a portion where the second hollow structure group 300b is positioned) having a modulus gradually changing in the supporting structure 100, probability of damage from an external force to the foldable display screen, due to abrupt change of the modulus of the supporting structure 100, may be effectively decreased.

It should be noted that in the second hollow structure group 300b, the length of the elongated hole of each hollow structure 300 in the same row of hollow structures 300 is equal to each other. The configuration that the length of the elongated hole of each hollow structure 300 in the same row of hollow structures 300 is gradually decreased in the direction close to the second bent region 100b means that in this row of hollow structures 300, the closer the elongated holes of the hollow structures 300 is to the second bent region 100b, the less the length of the elongated holes of the hollow structures 300 is. For example, for a hollow structure P1 and a hollow structure P2 positioned in the same row of the hollow structures 300, the hollow structure P1 is closer to the second bent region 100b than the hollow structure P2. Thus, a length H1 of the elongated hole of the hollow structure P1 is less than a length H2 of the elongated hole of the hollow structure P2.

Figure 15:
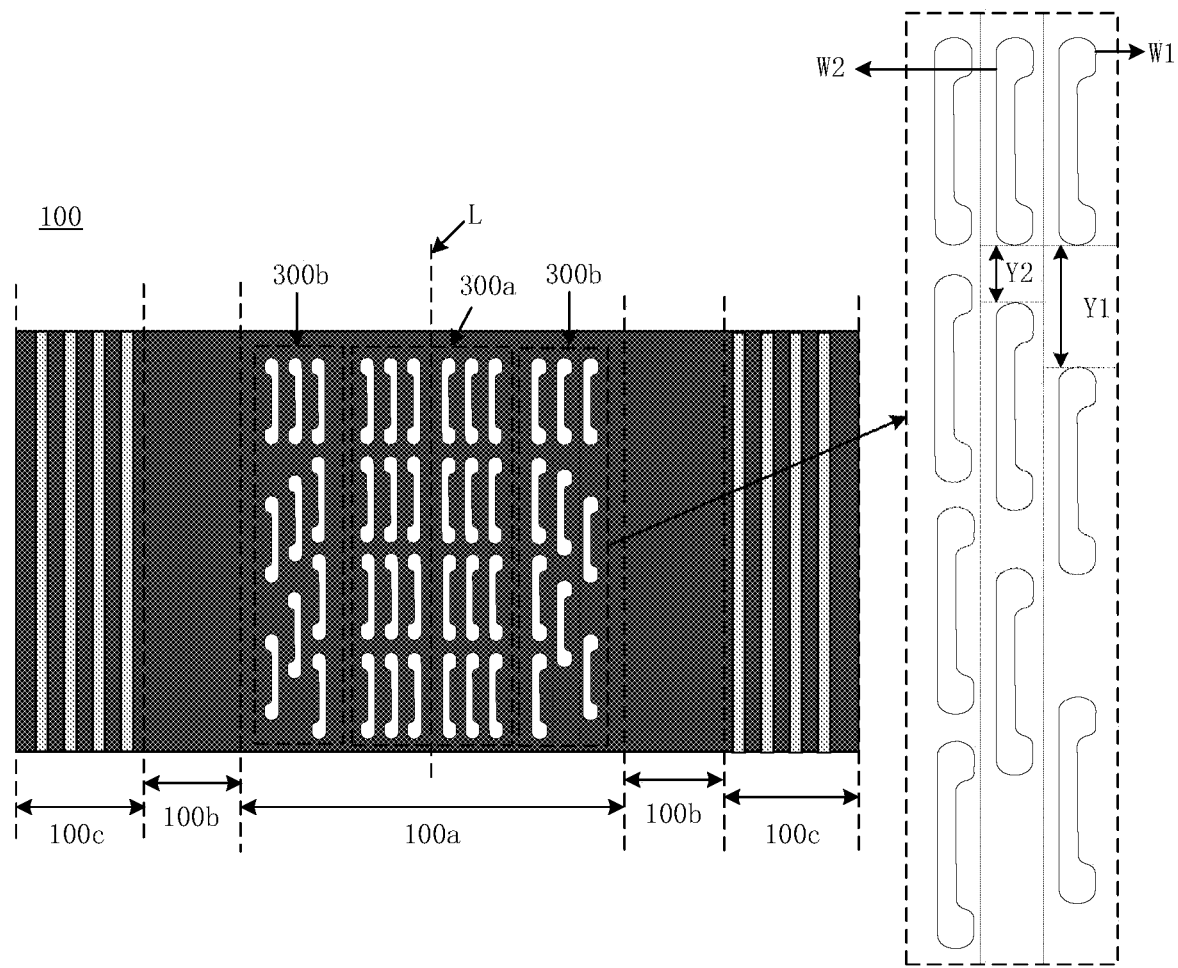
FIG. 15 is a top view of yet another supporting structure provided in an example of the disclosure.

A second situation is shown in FIG. 15, which shows a top view of yet another supporting structure provided in an example of the disclosure. In the second hollow structure group 300b, under the situation that a distance between every two adjacent hollow structures 300 in each column of hollow structures 300 is gradually increased in the direction close to the second bent region 100b, the contact area between the portion of the supporting structure 100 for the second hollow structure group 300b to be arranged and the flexible display panel may also be gradually increased in the direction close to the second bent region 100b. Thus, in this case, the probability of damage from an external force to the foldable display screen due to an abrupt change in the modulus of the supporting structure 100 may be effectively decreased.

It should be noted that in the second hollow structure group 300b, all the hollow structures 300 have the same shape, and the openings of the hollow structures 300 on the supporting structure 100 have equal areas. An area of an opening of this part of hollow structure 300 may be equal to an area of an opening of each hollow structure 300 in the first hollow structure group 300a on the supporting structure 100, or may be less than the area of an opening of each hollow structure 300 in the first hollow structure group 300a on the supporting structure 100, which is not limited in an example of the disclosure. In the second hollow structure group 300b, the configuration that a distance between every two adjacent hollow structures 300 in each column of hollow structures 300 is gradually increased in the direction close to the second bent region 100b means that the closer a column of hollow structures 300 is to the to the second bent region 100b, the greater a distance between every two adjacent hollow structures 300 in the column of hollow structures 300 is. For example, for a hollow structure column W1 and a hollow structure column W2, the hollow structure column W1 is closer to the second bent region 100b than the hollow structure column W2. Thus, a distance Y1 between every two adjacent hollow structures of the hollow structure column W1 is greater than a distance Y2 between every two adjacent hollow structures of the hollow structure column W2.

Figure 16:
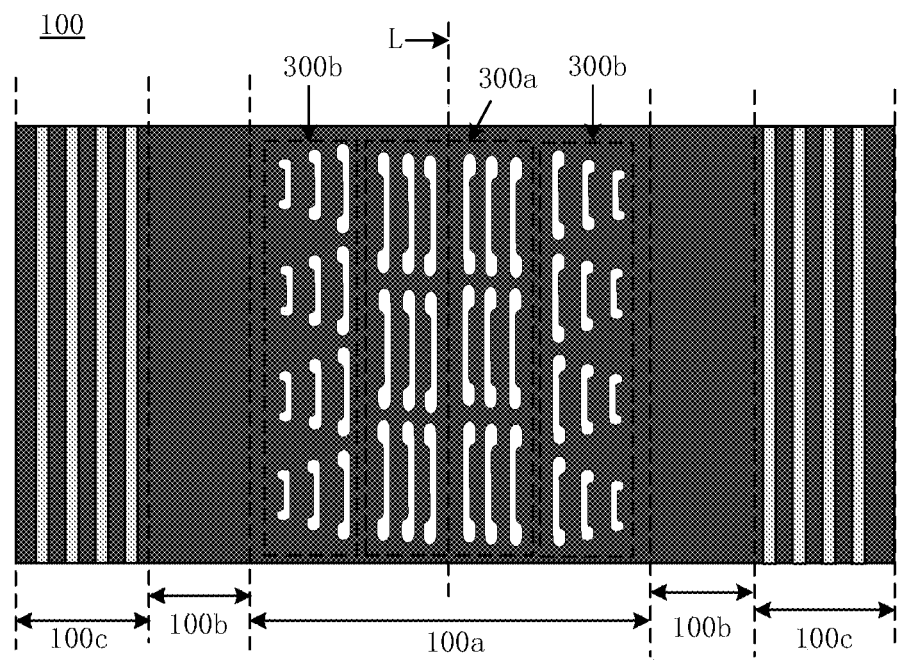
FIG. 16 is a top view of yet another supporting structure provided in an example of the disclosure.

A third situation is shown in FIG. 16, which shows a top view of yet another supporting structure provided in an example of the disclosure. In the second hollow structure group 300b, under the situation that the length of the elongated hole of each hollow structure 300 in the same row of hollow structures 300 is gradually decreased in the direction close to the second bent region 100b and a distance between every two adjacent hollow structures 300 in each column of hollow structures 300 is gradually increased in the direction close to the second bent region 100b, the contact area between the portion of the supporting structure 100 for the second hollow structure group 300b to be arranged and the flexible display panel may also be gradually increased in the direction close to the second bent region 100b. Thus, in this case, the probability of damage from an external force to the foldable display screen due to an abrupt change of the modulus of the supporting structure 100 may be effectively decreased.

Figure 17:
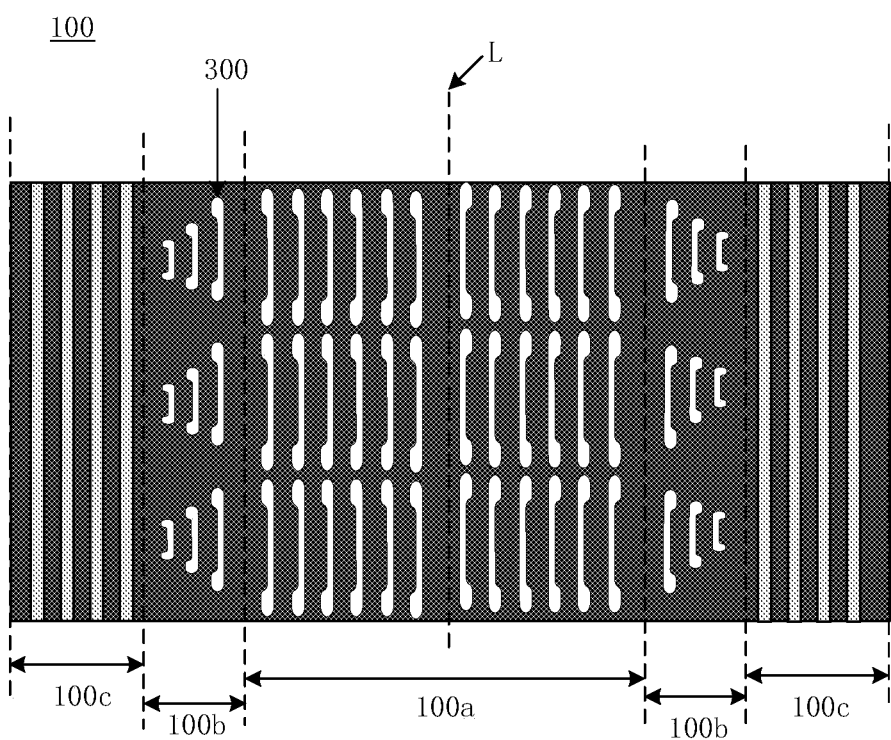
FIG. 17 is a top view of yet another supporting structure provided in an example of the disclosure.

A second optional implementation is as shown in FIG. 17, which shows a top view of yet another supporting structure provided in an example of the disclosure. The second bent region 100b in the supporting structure 100 is provided with a plurality of hollow structures 300. A first unit area of an opening of the hollow structures 300 in the first bent region 100a is larger than a second unit area of an opening of the hollow structures 300 in the second bent regions 100b, in which the first unit area is a ratio of an area of the openings of the hollow structures 300 in the first bent region 100a on the supporting structure 100 to an area of the supporting structure 100. The second unit area is a ratio of an area of the openings of the hollow structures 300 in the second bent regions 100b on the supporting structure 100 to the area of the supporting structure 100. Here, each of the plurality of hollow structures 300 arranged in the first bent region 100a has the same shape and size. The hollow structures 300 arranged in the second bent regions 100b and the plurality of hollow structures 300 arranged in the first bent region 100a may have the same shape but different sizes. The area of the supporting structure 100 in an example of the disclosure refers to an area of a region defined by all side surfaces of the supporting structure 100. For example, the supporting structure 100 is a rectangular supporting plate, and an area of the rectangular supporting plate is an area of a rectangular region defined by four side surfaces of the rectangular supporting plate.

In an example of the disclosure, in the situation where the second unit area of the opening of the hollow structures 300 in the second bent region 100b is smaller, the contact area between the supporting structure 100 and the flexible display panel in the second bent region 100b is larger. Thus, it is guaranteed that the capability of resisting pressing of a portion of the flexible display panel positioned in the second bent regions 100b is great. In this case, by arranging a plurality of hollow structures 300 in the second bent region 100b, the bending property of the second bent region 100b may be improved, and it is guaranteed that the capability of resisting pressing of the portion of the flexible display panel positioned in the second bent region 100b is excellent.

In the disclosure, by adjusting sizes and an arrangement interval of the plurality of hollow structures 300 in the second bent region 100b, the first unit area of the opening of the hollow structures 300 in the first bent region 100a may be larger than the second unit area of the opening of the hollow structures 300 in the second bent region 100b. For example, under the situation that the second bent region 100b is provided with a plurality of hollow structures 300, for the plurality of hollow structures 300 in the second bent region 100b, the length of the elongated hole of each hollow structure 300 in the same row of the hollow structures 300 is gradually decreased in a direction from the first bent region 100a to the second bent region 100b; or, a distance between every two adjacent hollow structures 300 in each row of hollow structures 300 is gradually increased in the direction from the first bent region 100a to the second bent region 100b; or, the length of the elongated hole of each hollow structure 300 in the same row of the hollow structures 300 is gradually decreased in a direction from the first bent region 100a to the second bent region 100b, and at the same time, a distance between every two adjacent hollow structures 300 in each row of hollow structures 300 is gradually increased in the direction from the first bent region 100a to the second bent region 100b. With such a design, the probability of damage from an external force to the foldable display screen due to an abrupt change of the modulus of the supporting structure 100 may be effectively decreased. It should be noted that for an arrangement mode of the plurality of hollow structures 300 in the second bent regions 100b, reference may be made to the arrangement mode of the plurality of hollow structures 300 in the above second hollow structure group 300b, which will not be repeated in an example of the disclosure.

In an example of the disclosure, there are various possible implementations for the structure of the third bent region 100c. The following two illustrative implementations are taken as examples of the disclosure for a schematic description.

Figure 18:
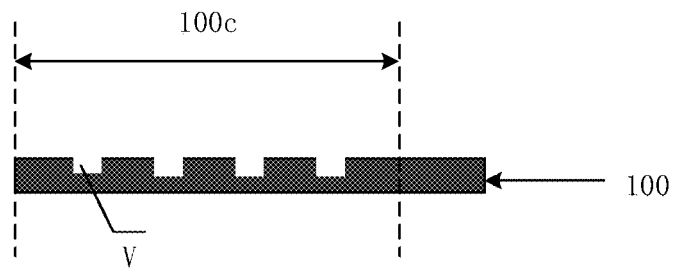
FIG. 18 is a sectional view along M-M' of the supporting structure shown in FIG. 13.

A first illustrative implementation is shown in FIGS. 13 to 18. A sectional view along M-M' of the foldable display screen shown in FIG. 13 is shown in FIG. 18. The third bent region 100c in the supporting structure 100 is provided with a plurality of elongated grooves V. An extension direction of a length of the elongated groove V is parallel to the extension direction of the length of the elongated hole, and notches of the elongated grooves V are positioned at a side, away from the flexible display panel, of the supporting structure 100. By arranging a plurality of elongated grooves V in the third bent region 100c, the bending property of the third bent region 100c may be improved.

Figure 19:
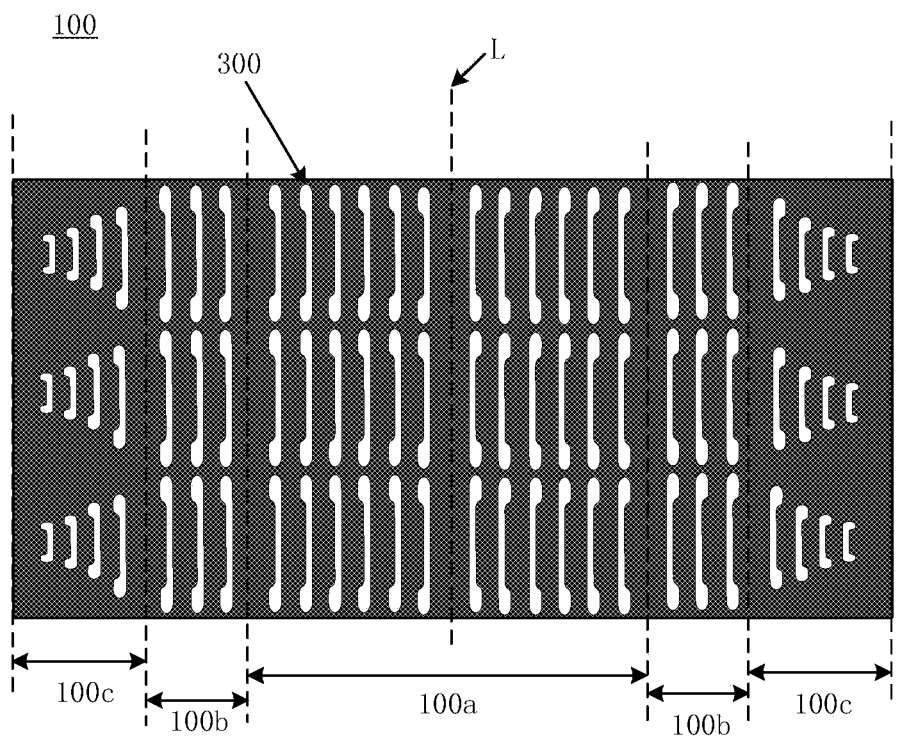
FIG. 19 is a top view of yet another supporting structure provided in an example of the disclosure.

A second illustrative implementation is as shown in FIG. 19, which shows a top view of yet another supporting structure provided in an example of the disclosure. The third bent region 100c of the supporting structure 100 may also be provided with a plurality of hollow structures 300. Further, the first unit area of the opening of the hollow structures 300 in the first bent region 100a is larger than a third unit area of an opening of the hollow structures 300 in the third bent region 100c, in which the third unit area is a ratio of the area of the opening of the hollow structures 300 in the third bent region 100c on the supporting structure 100 to the area of the supporting structure 100.

For example, the first unit area of the opening of the hollow structures 300 in the first bent region 100a may be equal to the second unit area of the opening of the hollow structures 300 in the second bent region 100b. Here, the plurality of hollow structures 300 in the first bent region 100a have the same shape and size. The plurality of hollow structures 300 in the second bent region 100b and the plurality of hollow structures 300 in the first bent region 100a may have the same shape, size, and distribution density.

In an example of the disclosure, in the situation where the third unit area of the opening of the hollow structures 300 in the third bent region 100c is smaller, the contact area between the supporting structure 100 and the flexible display panel in the third bent region 100c is larger. Thus, it is guaranteed that the capability of resisting pressing of a portion of the flexible display panel positioned in the third bent region 100c is great. In this case, by arranging a plurality of hollow structures 300 in the third bent region 100c, the bending property of the third bent region 100c in the supporting structure 100 may be improved, and the capability of resisting pressing of the portion of the flexible display panel positioned in the third bent region 100c may be significant.

In the disclosure, by adjusting the sizes and the arrangement interval of the plurality of hollow structures 300, the first unit area of the opening of the hollow structures 300 in the first bent region 100a may be larger than the third unit area of the opening of the hollow structures 300 in the third bent region 100c. For example, under the situation that the third bent region 100c is provided with a plurality of hollow structures 300, in the plurality of hollow structures 300 in the third bent region 100c, the length of the elongated hole of each hollow structure 300 in the same row of hollow structures 300 is gradually decreased in a direction from the first bent region 100a to the third bent region 100c; or, a distance between every two adjacent hollow structures 300 in each row of hollow structures 300 is gradually increased in the direction from the first bent region 100a to the third bent region 100c; or, the length of the elongated hole of each hollow structure 300 in the same row of hollow structures 300 is gradually decreased in a direction from the first bent region 100a to the third bent region 100c, and at the same time, a distance between every two adjacent hollow structures 300 in each row of hollow structures 300 is gradually increased in the direction from the first bent region 100a to the third bent region 100c. With such a design, the probability of damage from an external force to the foldable display screen due to an abrupt change of the modulus of the supporting structure 100 may be effectively decreased. It should be noted that, for the arrangement mode of the plurality of hollow structures 300 in the third bent region 100c, reference may be made to the arrangement mode of the plurality of hollow structures 300 in the above second hollow structure group 300b, which will not be repeated in an example of the disclosure.

In summary, an example of the disclosure provides the supporting structure. The plurality of hollow structures are distributed in an array in the first bent region of the supporting structure, and the width of the elongated hole is less than the width of the through hole in the hollow structure in the target direction perpendicular to the extension direction of the length of the elongated hole. Thus, by means of the through hole having a great width in the hollow structure, the bending property of the first bent region of the supporting structure may be improved such that the flexible display panel connected to the supporting structure may be repeatedly folded and unfolded. By means of the elongated hole having a small width in the hollow structure, a contact area between the first bent region and the flexible display panel may be increased, so as to improve the capability of resisting pressing of a portion of the flexible display panel positioned in the first bent region. It can be seen that by arranging the plurality of hollow structures on the supporting structure, the bending property of the supporting structure may be satisfied, and the capability of resisting pressing of the flexible display panel may be improved. Thus, damage from pressing the flexible display panel is avoided, and the service life of the foldable display screen is prolonged.

Figure 20:
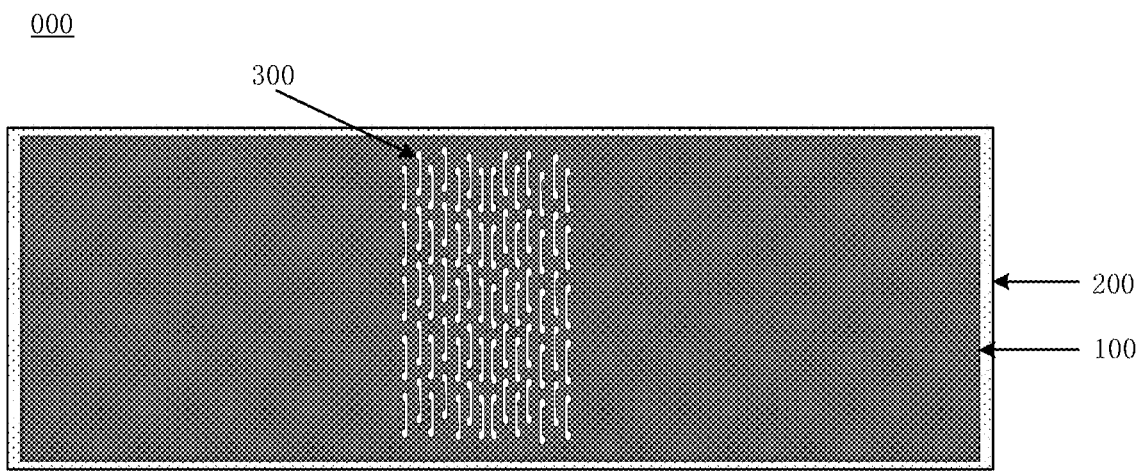
FIG. 20 is a top view of a foldable display screen provided in an example of the disclosure.

With reference to FIG. 20, a top view of a foldable display screen provided in an example of the disclosure is shown. An example of the disclosure further provides a foldable display screen 000. The foldable display screen 000 may include a flexible display panel 200 and a supporting structure 100. The supporting structure 100 is connected to a back surface (that is, a surface opposite a display surface of the flexible display panel) of the flexible display panel 200. Here, the flexible display panel 200 may be an organic light-emitting display (OLED) panel or an active matrix/organic light-emitting diode (AM-OLED) display panel. If the flexible display panel 200 is an OLED panel or an AM-OLED display panel, the flexible display panel 200 may be a top emission type display panel or a bottom emission type display panel.

An example of the disclosure further provides a terminal device, which may be a mobile phone, a tablet computer, a television, a monitor, a notebook computer, a digital photo frame, a navigator, or other products or components having a display function. The terminal device may include a power supply assembly and the above foldable display screen. The power supply assembly is electrically connected to the foldable display screen, and the power supply assembly is used for supplying power to the foldable display screen.

All of the above optional technical solutions can be combined arbitrarily to form optional examples of the disclosure, and will not be repeated here.

Those skilled in the art could easily conceive of other implementation solutions of the disclosure upon consideration of the description and the invention disclosed in the implementation. The disclosure is intended to cover any variations, uses, or adaptive changes of the disclosure, which follow the general principles of the disclosure and include common general knowledge or customary technical means, which are not disclosed in the disclosure, in the art. The description and the examples are to be regarded as illustrative only, and the true scope and spirit of the disclosure are indicated by the following claims.

It should be understood that the disclosure is not limited to a precise structure which has been described above and illustrated in the accompanying drawings, and may have various modifications and changes without departing from the scope of the disclosure. The scope of the disclosure is limited by the appended claims.

Additional non-limiting embodiments of the disclosure include the following.

A first embodiment includes a supporting structure for supporting a flexible display panel, including a first bent region.

The supporting structure is provided with a plurality of hollow structures distributed in an array in the first bent region, in which each of the plurality of hollow structures includes an elongated hole and at least one through hole, in which the at least one through hole is in communication with one end of the elongated hole, and a width of the elongated hole is less than a width of the at least one through hole in a target direction perpendicular to an extension direction of a length of the elongated hole.

A second embodiment includes the supporting structure of embodiment 1. A width of at least part of the at least one through hole in the target direction is gradually increased in a direction from the elongated hole to the at least one through hole.

A third embodiment includes the supporting structure of embodiment 2. The at least one through hole includes a first through sub-hole and a second through sub-hole in communication with the first through sub-hole, in which the first through sub-hole is closer to the elongated hole than the second through sub-hole.

In the target direction, a width of the first through sub-hole at all positions is gradually increased in a direction from the elongated hole to the second through sub-hole, and a width of the second through sub-hole at all positions is constant.

A fourth embodiment includes the supporting structure of embodiment 3. An inner wall of the first through sub-hole includes a first arc inner wall and a second arc inner wall arranged in the extension direction of the length of the elongated hole, in which the first arc inner wall having an arc convex surface is closer to the elongated hole than the second arc inner wall having an arc concave surface.

A fifth embodiment includes the supporting structure of embodiment 4. A shape of the first arc inner wall is the same as a shape of the second arc inner wall.

A sixth embodiment includes the supporting structure of embodiment 5. Each of the shape of the first arc inner wall and the shape of the second arc inner wall is an elliptical arc, in which a direction of a major axis of the elliptical arc is parallel to the extension direction of the length of the elongated hole, and a direction of a minor axis of the elliptical arc is parallel to the target direction.

A seventh embodiment includes the supporting structure of embodiment 6. A ratio of a width of the major axis of the elliptical arc to a width of the supporting structure in the target direction is 1/100 to 1/200, and a ratio of a width of the minor axis of the elliptical arc to the width of the supporting structure in the target direction is 1/100 to 1/400.

An eighth embodiment includes the supporting structure of embodiment 3. The at least one through hole further includes a third through sub-hole in communication with the second through sub-hole, and the second through sub-hole is closer to the elongated hole than the third through sub-hole.

In the target direction, a width of the third through sub-hole at all positions is less than or equal to the width of the second through sub-hole, and the width of the third through sub-hole at all positions is gradually decreased in a direction from the elongated hole to the third through sub-hole.

A ninth embodiment includes the supporting structure according to embodiment 8. An inner wall of the third through sub-hole is in a shape of a circular arc.

A tenth embodiment includes the supporting structure of embodiments 3-9. A ratio of the width of the elongated hole in the target direction to a width of the supporting structure in the target direction is 1/100-1/200, and a ratio of the length of the elongated hole to a length of the supporting structure in a direction perpendicular to the target direction is 1/5-1/20.

An eleventh embodiment includes the supporting structure of embodiments 1-9. The supporting structure is configured to be bent around a bending axis, and the extension direction of the length of the elongated hole is parallel to a direction of the bending axis.

A twelfth embodiment includes the supporting structure of embodiments 1-9. Each of the plurality of hollow structures is provided with a first inner wall and a second inner wall opposite the first inner wall, in which a portion of the first inner wall positioned in the elongated hole and a portion of the first inner wall positioned in the at least one through hole are coplanar, and a portion of the second inner wall positioned in the elongated hole and a portion of the second inner wall positioned in the at least one through hole are non-coplanar.

A thirteenth embodiment includes the supporting structure of embodiment 12. The plurality of hollow structures are divided into two groups at two sides of a bending axis, in which the first inner wall of each hollow structure in one group of hollow structures and the first inner wall of each hollow structure in another group of hollow structures are arranged back to back.

A fourteenth embodiment includes the supporting structure of embodiment 12. The first inner wall of a first hollow structure is adjacent to the first inner wall of a second hollow structure. The second inner wall of the first hollow structure is adjacent to the second inner wall of a third hollow structure, in which the first hollow structure, the second hollow structure, and the third hollow structure are any three adjacent hollow structures in a row of hollow structures, and the first hollow structure is positioned between the second hollow structure and the third hollow structure.

A fifteenth embodiment includes the supporting structure of embodiments 1-9. For any two adjacent hollow structures in a row of hollow structures, the at least one through hole of one hollow structure is adjacent to the elongated hole of another hollow structure.

A sixteenth embodiment includes the supporting structure of embodiments 1-9. The supporting structure further includes a second bent region positioned on two sides of the first bent region, in which the second bent region is configured as one of the following: that the second bent region is not provided with hollow structures, and that the second bent region is provided with a plurality of hollow structures, in which a first unit area of an opening of the hollow structures in the first bent region is larger than a second unit area of an opening of the hollow structures in the second bent regions, in which the first unit area is a ratio of an area of the opening of the hollow structures in the first bent region on the supporting structure to an area of the first bent region of the supporting structure, and the second unit area is a ratio of an area of the opening of the hollow structures in the second bent region on the supporting structure to the area of the second bent region of the supporting structure.

A seventeenth embodiment includes the supporting structure of embodiment 16. The supporting structure further includes a third bent region positioned on two sides of the first bent region, and the second bent region is positioned between the third bent region and the first bent region.

The third bent region is provided with a plurality of elongated grooves, an extension direction of a length of the elongated groove being parallel to the extension direction of the length of the elongated hole, and notches of the elongated grooves being positioned at a side, away from the flexible display panel, of the supporting structure.

An eighteenth embodiment includes the supporting structure of embodiment 16. The supporting structure further includes a third bent region positioned on two sides of the first bent region, and the second bent region is positioned between the third bent region and the first bent region.

The third bent region is provided with a plurality of hollow structures, in which the first unit area of the opening of the hollow structures in the first bent region is larger than a third unit area of an opening of the hollow structures in the third bent region, in which the third unit area is a ratio of an area of the opening of the hollow structures on the supporting structure to the area of the third bent region of the supporting structure.

A nineteenth embodiment includes a foldable display screen, including a flexible display panel and a supporting structure according to embodiment 1.

The supporting structure is connected to a back surface of the flexible display panel.

A twentieth embodiment includes a terminal device, including the foldable display screen according to embodiment 19.

What is claimed is:

1. A supporting structure for supporting a flexible display panel, comprising:
   a first bent region, wherein
      the supporting structure is provided with a plurality of hollow structures distributed in an array in the first bent region, wherein each of the plurality of hollow structures comprises an elongated hole and at least one through hole, wherein the at least one through hole is in communication with an end of the elongated hole, and a width of the elongated hole is less than a width of the at least one through hole in a target direction perpendicular to an extension direction of a length of the elongated hole,
      a width of at least parts of the at least one through hole in the target direction is gradually increased in a direction from the elongated hole to the at least one through hole,
      the at least one through hole comprises a first through sub-hole and a second through sub-hole in communication with the first through sub-hole, wherein the first through sub-hole is closer to the elongated hole than the second through sub-hole,
      in the target direction, a width of the first through sub-hole at all positions is gradually increased in a direction from the elongated hole to the second through sub-hole, and a width of the second through sub-hole at all positions is constant, and
      each of the plurality of hollow structures is provided with a first inner wall and a second inner wall opposite the first inner wall, wherein a portion of the first inner wall positioned in the elongated hole and a portion of the first inner wall positioned in the at least one through hole are coplanar, and a portion of the second inner wall positioned in the elongated hole and a portion of the second inner wall positioned in the at least one through hole are non-coplanar.

2. The supporting structure of claim 1, wherein an inner wall of the first through sub-hole comprises a first arc inner wall and a second arc inner wall arranged in the extension direction of the length of the elongated hole, wherein the first arc inner wall having an arc convex surface is closer to the elongated hole than the second arc inner wall having an arc concave surface.

3. The supporting structure of claim 2, wherein a shape of the first arc inner wall is a same as a shape of the second arc inner wall.

4. The supporting structure of claim 3, wherein each of the shape of the first arc inner wall and the shape of the second arc inner wall is an elliptical arc, wherein a direction of a major axis of the elliptical arc is parallel to the extension direction of the length of the elongated hole, and a direction of a minor axis of the elliptical arc is parallel to the target direction.

5. The supporting structure of claim 4, wherein a ratio of a width of the major axis of the elliptical arc to a width of the supporting structure in the target direction is 1/100 to 1/200, and a ratio of a width of the minor axis of the elliptical arc to the width of the supporting structure in the target direction is 1/100 to 1/400.

6. The supporting structure of claim 1, wherein the at least one through hole further comprises a third through sub-hole in communication with the second through sub-hole, and the second through sub-hole is closer to the elongated hole than the third through sub-hole, and wherein in the target direction, a width of the third through sub-hole at all positions is less than or equal to the width of the second through sub-hole, and the width of the third through sub-hole at all positions is gradually decreased in a direction from the elongated hole to the third through sub-hole.

7. The supporting structure according to claim 6, wherein an inner wall of the third through sub-hole is in a shape of a circular arc.

8. The supporting structure of claim 1, wherein a ratio of the width of the elongated hole in the target direction to a width of the supporting structure in the target direction is 1/100 to 1/200, and a ratio of the length of the elongated hole to a length of the supporting structure in a direction perpendicular to the target direction is 1/5 to 1/20.

9. The supporting structure of claim 1, wherein the supporting structure is configured to be bent around a bending axis, and the extension direction of the length of the elongated hole is parallel to a direction of the bending axis.

10. The supporting structure of claim 1, wherein the plurality of hollow structures are divided into two groups at two sides of a bending axis, wherein the first inner wall of each hollow structure in one group of hollow structures and the first inner wall of each hollow structure in another group of hollow structures are arranged back to back.

11. The supporting structure of claim 1, wherein the first inner wall of a first hollow structure is adjacent to the first inner wall of a second hollow structure, and the second inner wall of the first hollow structure is adjacent to the second inner wall of a third hollow structure, wherein the first hollow structure, the second hollow structure and the third hollow structure are any three adjacent hollow structures in a row of hollow structures, and the first hollow structure is positioned between the second hollow structure and the third hollow structure.

12. The supporting structure of claim 1, wherein for any two adjacent hollow structures in a row of hollow structures, the at least one through hole of one hollow structure is adjacent to an elongated hole of another hollow structure.

13. The supporting structure of claim 1, wherein the supporting structure further comprises a second bent region positioned on two sides of the first bent region, wherein the second bent region is not provided with hollow structures.

14. The supporting structure of claim 13, wherein the supporting structure further comprises a third bent region positioned on two sides of the first bent region, and the second bent region is positioned between the third bent region and the first bent region, and wherein the third bent region is provided with a plurality of elongated grooves, an extension direction of a length of the plurality of elongated grooves being parallel to the extension direction of the length of the elongated hole, and notches of the elongated grooves being positioned at a side, away from the flexible display panel, of the supporting structure.

15. The supporting structure of claim 13, wherein the supporting structure further comprises a third bent region positioned on two sides of the first bent region, and the second bent region is positioned between the third bent region and the first bent region, and wherein the third bent region is provided with a plurality of hollow structures, wherein the first unit area of the opening of the hollow structures in the first bent region is larger than a third unit area of an opening of the hollow structures in the third bent region, wherein the third unit area is a ratio of an area of the opening of the hollow structures in the third bent region on the supporting structure to the area of the supporting structure.

16. The supporting structure of claim 1, further comprises:

a second bent region positioned on two sides of the first bent region, wherein the second bent region is provided with a plurality of hollow structures, wherein a first unit area of an opening of the hollow structures in the first bent region is larger than a second unit area of an opening of the hollow structures in the second bent regions, wherein the first unit area is a ratio of an area of the opening of the hollow structures in the first bent region on the supporting structure to an area of the supporting structure, and wherein the second unit area is a ratio of an area of the opening of the hollow structures in the second bent region on the supporting structure to the area of the supporting structure.

17. The supporting structure of claim 16, further comprises:

a third bent region positioned on two sides of the first bent region, and the second bent region is positioned between the third bent region and the first bent region, and wherein the third bent region is provided with a plurality of elongated grooves, an extension direction of a length of the plurality of elongated grooves being parallel to the extension direction of the length of the elongated hole, and notches of the elongated grooves being positioned at a side, away from the flexible display panel, of the supporting structure.

18. The supporting structure of claim 16, further comprises:

a third bent region positioned on two sides of the first bent region, and the second bent region is positioned between the third bent region and the first bent region, and wherein the third bent region is provided with a plurality of hollow structures, wherein the first unit area of the opening of the hollow structures in the first bent region is larger than a third unit area of an opening of the hollow structures in the third bent region, wherein the third unit area is a ratio of an area of the opening of the hollow structures in the third bent region on the supporting structure to the area of the supporting structure.

19. A foldable display screen, comprising:

a flexible display panel; and a supporting structure for supporting the flexible display panel, wherein the supporting structure is connected to a back surface of the flexible display panel, and the supporting structure comprises a first bent region, the supporting structure is provided with a plurality of hollow structures distributed in an array in the first bent region, wherein each of the plurality of hollow structures comprises an elongated hole and at least one through hole, wherein the at least one through hole is in communication with one end of the elongated hole, and a width of the elongated hole is less than a width of the at least one through hole in a target direction perpendicular to an extension direction of a length of the elongated hole, a width of at least parts of the at least one through hole in the target direction is gradually increased in a direction from the elongated hole to the at least one through hole, the at least one through hole comprises a first through sub-hole and a second through sub-hole in communication with the first through sub-hole, wherein the first through sub-hole is closer to the elongated hole than the second through sub-hole, in the target direction, a width of the first through sub-hole at all positions is gradually increased in a direction from the elongated hole to the second through sub-hole, and a width of the second through sub-hole at all positions is constant, and each of the plurality of hollow structures is provided with a first inner wall and a second inner wall opposite the first inner wall, wherein a portion of the first inner wall positioned in the elongated hole and a portion of the first inner wall positioned in the at least one through hole are coplanar, and a portion of the second inner wall positioned in the elongated hole and a portion of the second inner wall positioned in the at least one through hole are non-coplanar.

20. A terminal device, comprising:

a foldable display screen comprising a flexible display panel and a supporting structure for supporting the flexible display panel, wherein the supporting structure is connected to a back surface of the flexible display panel, and the supporting structure comprises a first bent region, the supporting structure is provided with a plurality of hollow structures distributed in an array in the first bent region, wherein each of the plurality of hollow structures comprises an elongated hole and at least one through hole, wherein one through hole is in communication with one end of the elongated hole, and a width of the elongated hole is less than a width of the at least one through hole in a target direction perpendicular to an extension direction of a length of the elongated hole, a width of at least parts of the at least one through hole in the target direction is gradually increased in a direction from the elongated hole to the at least one through hole, the at least one through hole comprises a first through sub-hole and a second through sub-hole in communication with the first through sub-hole, wherein the first through sub-hole is closer to the elongated hole than the second through sub-hole, in the target direction, a width of the first through sub-hole at all positions is gradually increased in a direction from the elongated hole to the second through sub-hole, and a width of the second through sub-hole at all positions is constant, and each of the plurality of hollow structures is provided with a first inner wall and a second inner wall opposite the first inner wall, wherein a portion of the first inner wall positioned in the elongated hole and a portion of the first inner wall positioned in the at least one through hole are coplanar, and a portion of the second inner wall positioned in the elongated hole and a portion of the second inner wall positioned in the at least one through hole are non-coplanar.

\* \* \* \* \*